United States Patent
Heo et al.

(10) Patent No.: US 8,711,720 B2
(45) Date of Patent: Apr. 29, 2014

(54) COGNITIVE RADIO COOPERATIVE SPECTRUM SENSING METHOD AND FUSION CENTER PERFORMING COGNITIVE RADIO COOPERATIVE SPECTRUM SENSING

(75) Inventors: Jun Heo, Seoul (KR); Chong Joon You, Seoul (KR); Jae Young Lee, Seoul (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 333 days.

(21) Appl. No.: 13/174,420

(22) Filed: Jun. 30, 2011

(65) Prior Publication Data
US 2012/0163355 A1 Jun. 28, 2012

(30) Foreign Application Priority Data
Dec. 28, 2010 (KR) .................. 10-2010-0136851

(51) Int. Cl.
*H04B 14/06* (2006.01)
(52) U.S. Cl.
USPC ......................................... 370/252
(58) Field of Classification Search
None
See application file for complete search history.

(56) References Cited

U.S. PATENT DOCUMENTS

| 7,949,357 B2 * | 5/2011 | Huttunen et al. | 455/509 |
| 2009/0247201 A1 * | 10/2009 | Ye et al. | 455/509 |
| 2010/0248760 A1 * | 9/2010 | Li et al. | 455/500 |

OTHER PUBLICATIONS

Digham, F. F., Alouini,k M. S., et al., "On the Energy Detection of Unknown Signals over Fading Channels", IEEE Transactions on Communications, vol. 55, No. 1, Jan. 2007, 4 pages.
Zayen, B., Hayar, A., "Cooperative Spectrum Sensing Technique Based on Sub Space Analysis for Cognitive Radio Networks", COGIS'09, COGnitive Systems with Interactive Sensers Conference, Nov. 16-18, 2009, Paris, France, 5 pages.
Mitola, J., Maguire, G. Q., "Cognitive Radio: Making Software Radios More Personal", IEEE Personal Communications, Aug. 1999, 6 pages.
Ghasemi, A., Sousa E., "Collaborative Spectrum Sensing for Opportunistic Access in Fading Enviroments", IEEE, Nov. 2005, 6 pages.

* cited by examiner

*Primary Examiner* — Yong Zhou
(74) *Attorney, Agent, or Firm* — Osha Liang LLP

(57) ABSTRACT

Provided are a cognitive radio (CR) cooperative spectrum sensing method and a fusion center (FC) performing CR cooperative spectrum sensing. The CR cooperative spectrum sensing method includes receiving, at an FC, local spectrum sensing information about a predetermined frequency band from each of N secondary users (SUs) in a predetermined zone, determining, at the FC, the optimum number of SUs for determining whether the predetermined frequency band is being used by a primary user (PU) on the basis of the received local spectrum sensing information, and performing cooperative spectrum sensing on the basis of local spectrum sensing information received from the optimum number of SUs in the predetermined zone. The method is implemented by the FC. Accordingly, the method and FC find how many SUs are needed to determine that a frequency of a PU is being used in a corresponding-channel situation, thereby enabling efficient communication.

10 Claims, 4 Drawing Sheets

COGNITIVE RADIO COOPERATIVE SPECTRUM SENSING METHOD AND FUSION CENTER PERFORMING COGNITIVE RADIO COOPERATIVE SPECTRUM SENSING

CLAIM FOR PRIORITY

This application claims priority to Korean Patent Application No. 10-2010-0136851 filed on Dec. 28, 2010 in the Korean Intellectual Property Office (KIPO), the entire contents of which are hereby incorporated by reference.

BACKGROUND OF INVENTION

1. Technical Field

Example embodiments of the present invention relate to a national research and development project having subject No. ITAC1090103100090001000100100, project name "University IT Research Center Promotion and Support Project," and subject title "Research on Embedded Software Technology for Convergence Terminal."

Example embodiments of the present invention relate in general to radio communication, and more specifically, to a cognitive radio (CR) cooperative spectrum sensing method and a fusion center (FC) performing CR cooperative spectrum sensing.

2. Related Art

Currently, radio communication technology is being researched and developed for a ubiquitous network in which any information can be exchanged with anybody, anytime, anywhere. Conventionally used for mobile communication and broadcasting, radio waves are increasingly used in other areas of life, such as traffic, medical treatment, science, and public order, rapidly driving up demand for frequency resources. This increasing demand for frequency resources is further accelerated by advances in radio communication technology. To solve the frequency shortage problem and maximize efficiency in frequency usage, CR technology for detecting vacant frequencies that are not actually being used and performing communication is attracting attention.

CR technology automatically enables desired communication by automatically detecting unused frequencies according to place and time while protecting authorized adjacent radio stations. The CR technology detects a spectrum that is dispersed at various intervals and has continuously varying occupation time, and enables the spectrum to be reused by determining a frequency bandwidth, output, modulation scheme, etc. appropriate for the environment, thereby improving the efficiency with which limited frequency resources are utilized. Since 2004, the Institute of Electrical and Electronics Engineers (IEEE) has been pushing ahead with the standardization of CR technology for a television frequency band.

CR technology is based on spectrum sensing techniques which allow a secondary user (SU) to sense the surrounding radio environment and detect a vacant frequency band that a primary user (PU) is not using. The spectrum sensing techniques include matched filter, signal feature detection, energy detection, and so on. Among the spectrum sensing techniques, energy detection can be implemented even when a feature of a signal to be transmitted is unknown, and is most appropriate in consideration of complexity and sensing time. However, when one SU separately performs spectrum sensing, the SU may not accurately detect a vacant frequency band because of hidden nodes, shadow fading, multipath fading, etc. To solve these problems, a cooperative spectrum sensing technique has appeared, in which results separately sensed by SUs are shared in an FC to determine whether or not a spectrum is occupied.

Cooperative spectrum sensing includes soft decision in which results observed by several SUs are first transmitted to an FC which then makes a final decision on the basis of the results, and hard decision in which respective SUs first determine whether or not a spectrum is used and then transmit the results to an FC which makes a final decision. When respective soft decision results of CR SUs are transmitted to an FC, frequency efficiency is degraded. Thus, hard decision cooperative spectrum sensing is frequently used.

In such hard decision cooperative spectrum sensing, whether the corresponding frequency band is vacant or in use is determined with reference to a threshold $\lambda$ of energy detection. In other words, 1, indicating that the frequency band is in use, is transmitted when energy is greater than $\lambda$, and 0, indicating that the frequency band is not in use, is transmitted when energy is smaller than $\lambda$. Then, an FC makes a final decision using the CR information (0 or 1) transmitted by an SU, according to a fusion rule used in the FC.

REFERENCE

Patent Document (Patent Reference 0001) US 2010/0248760 A1. Publication date: Sep. 30, 2010, Title: System and method for cooperative spectrum sensing in cognitive radio systems Non-Patent Document (Non-patent Reference 0001) [Document 1] J. Mitola and G. Q. Maguire, "Cognitive radio: Making software radios more personal," IEEE Pers. Commun., vol. 6, pp. 13-18, August 1999. This reference proposed Cognitive Radio for the first time.

(Non-patent Reference 0002) [Document 2] A. Ghasemi, E. S. Sousa, "Collaborative spectrum sensing for opportunistic access in fading environments," In Proc., IEEE. Inter. Symp. Dyspan 2005, pp. 131-136, November 2005. This reference proposed Cooperative Spectrum Sensing for the first time.

(Non-patent Reference 0003) [Document 3] F. F. Digham, M. S. Alouini, et al., "On the energy detection of unknown signals over fading channels," IEEE Transactions on Communications, vol. 55, No. 1, pp. 21-24, January 2007. This reference discloses miss-detection probability and false alarm probability of an energy detection technique as numerical expressions.

SUMMARY OF INVENTION

Accordingly, example embodiments of the present invention are provided to substantially obviate one or more problems due to limitations and disadvantages of the related art.

Example embodiments of the present invention provide a cognitive radio (CR) cooperative spectrum sensing method capable of determining the optimum number of secondary users (SUs) for determining that a primary user (PU) is using a predetermined frequency band.

Example embodiments of the present invention also provide a fusion center (FC) for implementing the method.

In some example embodiments, a CR cooperative spectrum sensing method includes: receiving, at an FC, local spectrum sensing information about a predetermined frequency band from each of N number of SUs in a predetermined zone; determining, at the FC, the optimum number of SUs for determining whether the predetermined frequency band is being used by a PU on the basis of the received local spectrum sensing information; and performing cooperative spectrum sensing on the basis of local spectrum sensing information received from the optimum number of SUs in the predetermined zone.

The local spectrum sensing information may be a determination signal indicating a determination of whether or not the predetermined frequency band is being used by the PU made by the SUs.

Determining, at the FC, the optimum number of SUs may include: providing a threshold of energy detection for generating the determination signal, a signal-to-noise ratio (SNR) of an additive white Gaussian noise (AWGN) channel, and a time-bandwidth product that is a product of a measurement time for generating the determination signal and a bandwidth of the predetermined frequency band; calculating miss-detection probabilities, false alarm probabilities, and predetermined frequency band use probabilities of the SUs on the basis of the threshold, the SNR, the time-bandwidth product, and the local spectrum sensing information; and calculating the optimum number of SUs on the basis of the miss-detection probabilities, the false alarm probabilities, and the predetermined frequency band use probabilities.

Calculating the optimum number of SUs may include: calculating a number $\tilde{K}$ minimizing an overall detection error probability using the following equation:

$$\tilde{K} = \frac{\ln\left(\frac{P(H_1)P_m^N}{P(H_0)(1-P_f)^N}\right)}{\ln\left(\frac{P_f \cdot P_m}{(1-P_f)(1-P_m)}\right)},$$

Here, P(H1) is a probability that the PU will be using the predetermined frequency band, P(H0), is a probability that the PU will not be using the predetermined frequency band, Pm is a miss-detection probability of an SU (a probability that the SU cannot detect a signal transmitted from the PU), Pf is a false alarm probability of the SU, and N is the number of SUs in the predetermined zone; and determining a natural number closest to $\tilde{K}$ as the optimum number of SUs.

The predetermined zone may be a wireless fidelity (Wi-Fi) zone, and the FC may be an access point (AP) for Wi-Fi.

In other example embodiments, an FC performing CR cooperative spectrum sensing includes: a receiver configured to receive local spectrum sensing information about a predetermined frequency band from each of N number of SUs in a predetermined zone; an SU number determiner connected with the receiver and configured to determine the optimum number of SUs for determining whether the predetermined frequency band is being used by a PU on the basis of the received local spectrum sensing information; and a cooperative spectrum sensor connected with the receiver and the SU number determiner, and configured to perform cooperative spectrum sensing on the basis of local spectrum sensing information received from the optimum number of SUs in the predetermined zone determined by the SU number determiner.

The local spectrum sensing information may be a determination signal indicating a determination of whether or not the predetermined frequency band is being used by the PU made by the SUs.

The FC may further include a storage configured to store a threshold, an SNR, and a time-bandwidth product wherein the threshold may be a threshold of energy detection for generating the determination signal, wherein the SNR may be an SNR of an AWGN channel, and wherein the time-bandwidth product may be a product of a measurement time for generating the determination signal and the bandwidth of the predetermined frequency band, and the SU number determiner may calculate miss-detection probabilities, false alarm probabilities, and predetermined frequency band use probabilities of the SUs on the basis of the threshold, the SNR, the time-bandwidth product, and the local spectrum sensing information, and calculate the optimum number of SUs on the basis of the miss-detection probabilities, the false alarm probabilities, and the predetermined frequency band use probabilities.

The SU number determiner may calculate a number $\tilde{K}$ minimizing an overall detection error probability using the following equation:

$$\tilde{K} = \frac{\ln\left(\frac{P(H_1)P_m^N}{P(H_0)(1-P_f)^N}\right)}{\ln\left(\frac{P_f \cdot P_m}{(1-P_f)(1-P_m)}\right)},$$

and determine a natural number closest to $\tilde{K}$ as the optimum number of SUs. Here, P(H1) is a probability that the PU will be using the predetermined frequency band, P(H0) is a probability that the PU will not be using the predetermined frequency band, Pm is a miss-detection probability of an SU (probability that the SU cannot detect a signal transmitted from the PU), Pf is a false alarm probability of the SU, and N is the number of SUs in the predetermined zone.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
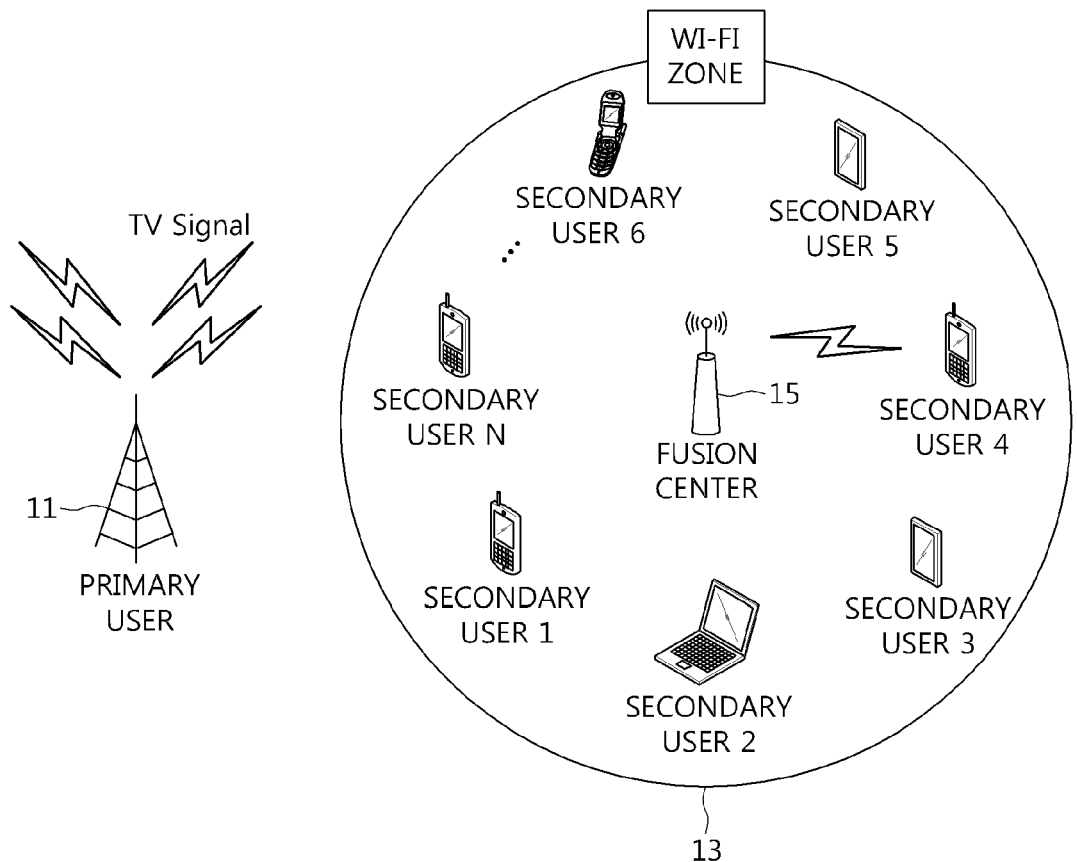
FIG. 1 schematically illustrates an overall wireless communication network including a fusion center (FC) according to an example embodiment of the present invention when a television frequency band is used by secondary users (SUs) in a wireless fidelity (Wi-Fi) zone.

Example embodiments of the present invention are disclosed herein. However, specific structural and functional details disclosed herein are merely representative for purposes of describing example embodiments of the present invention. Example embodiments of the present invention may be embodied in many alternate forms and should not be construed as limited to example embodiments of the present invention set forth herein.

Accordingly, while the invention is susceptible to various modifications and alterations in form, specific embodiments thereof are shown by way of example in the drawings and will herein be described in detail. It should be understood, however, that there is no intent to limit the invention to the particular forms disclosed. On the contrary, the invention is to cover all modifications, equivalents, and alternatives falling within the spirit and scope of the invention. Like numbers refer to like elements throughout the description and the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe a spatial or sequential relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described with reference to appended drawings.

When K or more secondary users (SUs) among N number of SUs send information "1", a fusion center (FC) generally determines that a frequency band is in use as a final decision. Otherwise, the FC determines that the frequency band is not in use.

Thus, it is necessary to find how many SUs need to detect that a primary user (PU) is using a predetermined frequency band using a cooperative spectrum sensing technique, in which several SUs sense surrounding radio environments to detect a vacant frequency band, in order to optimize performance by making a final decision that the PU is using the frequency band.

An Institute of Electrical and Electronics Engineers (IEEE) 802.22 wireless regional area network includes three main components: a PU, an SU, and an FC., The PU is a digital/analog television channel, the SU is customer-premises equipment (CPE), for example, a smartphone, laptop computer, netbook, and personal digital assistant (PDA), in a wireless fidelity (Wi-Fi) zone, and the FC is an access point (AP).

FIG. 1 illustrates an overall wireless communication network including an FC according to an example embodiment of the present invention. The overall wireless communication network shown in FIG. 1 includes a PU 11 and a Wi-Fi zone 13. The PU 11 may use a television signal having a frequency band centered at, for example, 2.4 GHz. N number of SUs, that is, SU 1 to SU N, are included in the Wi-Fi zone 13.

The SUs 1 to N determine whether the frequency band used by the PU 11 is vacant or in use. The determination is made with reference to a threshold $\lambda$ of energy detection. In other words, "1," indicating that the frequency band is in use, is generated as local spectrum sensing information when detected energy is greater than $\lambda$, and "0," indicating that the frequency band is not in use, is generated as local spectrum sensing information when detected energy is smaller than $\lambda$. Respective SUs transmit the local spectrum sensing information to an FC 15.

The FC 15 makes a final decision whether the PU 11 is using the frequency band using the local spectrum sensing information transmitted by the respective SUs according to fusion rule used in the FC 15. To make such a final decision, the FC 15 may receive local spectrum sensing information from all the SUs 1 to N included in the Wi-Fi zone 13. In this spectrum sensing technique, two types of errors occur. One is a miss-detection error and the other is a false alarm error. To minimize detection errors consisting of the two types of error by making a final decision that the PR is using the predetermined frequency band, the FC 15 determines the optimum number of SUs required to detect that the PR is using the predetermined frequency band.

Determination of the optimum number of SUs made by the FC 15 will be described with reference to FIGS. 2 and 3.

Figure 2:
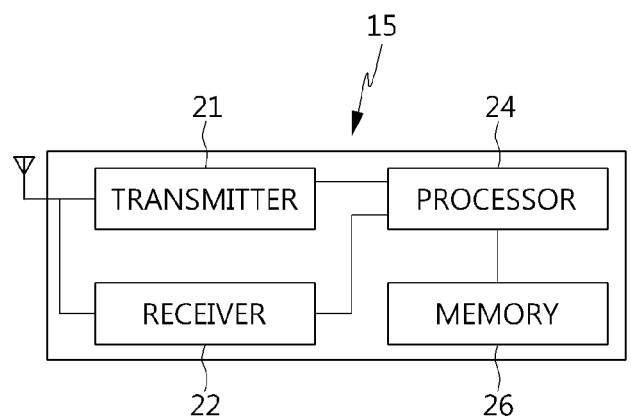
FIG. 2 is a block diagram of an FC according to an example embodiment of the present invention.

FIG. 2 is a block diagram showing the internal constitution of the FC 15. In FIG. 2, the FC 15 has a transmitter 21 and a receiver 22 connected with an antenna, a processor 24 connected with the transmitter 21 and the receiver 22, and a memory 26 connected with the processor 24. The receiver 22 may receive local spectrum sensing information from the SUs 1 to N in the Wi-Fi zone 13 shown in FIG. 1. The processor 24 determines the optimum number of SUs using the received local spectrum sensing information and data stored in the memory 26.

Figure 3:
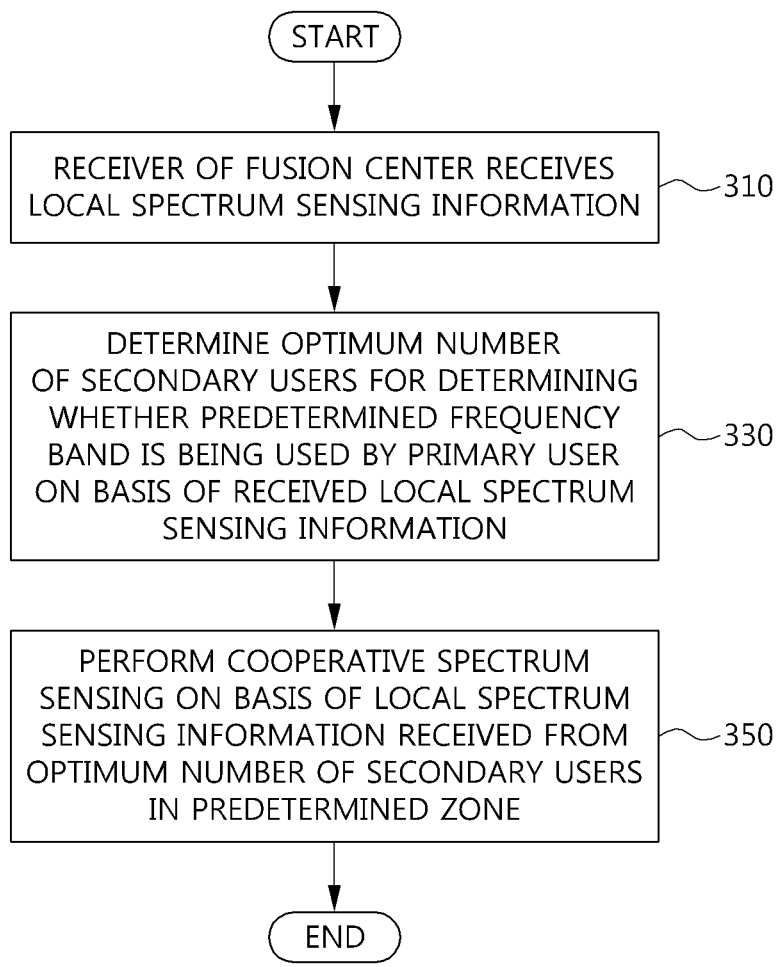
FIG. 3 is a flowchart illustrating operation of the FC of FIG. 2.

FIG. 3 is a flowchart illustrating operation of the FC 15 shown in FIG. 2. Operation of the FC 15 of FIG. 2 will be described with reference to the flowchart of FIG. 3.

In the FC 15, the receiver 22 receives local spectrum sensing information through the antenna (step 310). The local spectrum sensing information may have a value of 1 or 0, that is a determination signal resulting from a determination of whether or not a PU is using a predetermined frequency band, made by an SU. The receiver 22 provides the received local spectrum sensing information to the processor 24.

The processor 24 determines the optimum number of SUs for determining whether the PU is using the predetermined frequency band on the basis of the received local spectrum sensing information (step 330). The memory 26 stores data that is used for the processor 24 to determine the optimum number of SUs.

To determine the optimum number of SUs, the processor 24 provides a threshold, a signal-to-noise ratio (SNR), and a time-bandwidth product. In this step, the threshold is a threshold λ of energy detection for generating the determination signal, the SNR is an SNR of an additive white Gaussian noise (AWGN) channel, and the time-bandwidth product is a product of a measurement time for generating the determination signal and the bandwidth of the predetermined frequency band. Then, the processor 24 calculates miss-detection probabilities, false alarm probabilities, and predetermined frequency band use probabilities of SUs on the basis of the threshold λ, the SNR, the time-bandwidth product, and the local spectrum sensing information.

When the FC 15 calculates a final miss-detection probability and a final false alarm probability using cooperative spectrum sensing, an OR rule or AND rule may be used. The OR rule is a fusion method in which the FC 15 determines that a PU signal exists when at least one SU determines that the PU signal exists, and the AND rule is a fusion method in which the FC 15 determines that a PU signal exists only when all SUs determine that the PU signal exists.

These two methods are extreme fusion methods and are not efficient. Thus, example embodiments of the present invention use a K-out-of-N rule, in which a final decision that a PU signal exists is made when K or more SUs among a total of N SUs determine that the PU signal exists. The K-out-of-N rule includes the OR rule when K is 1, and the AND rule when K is N.

Figure 4:
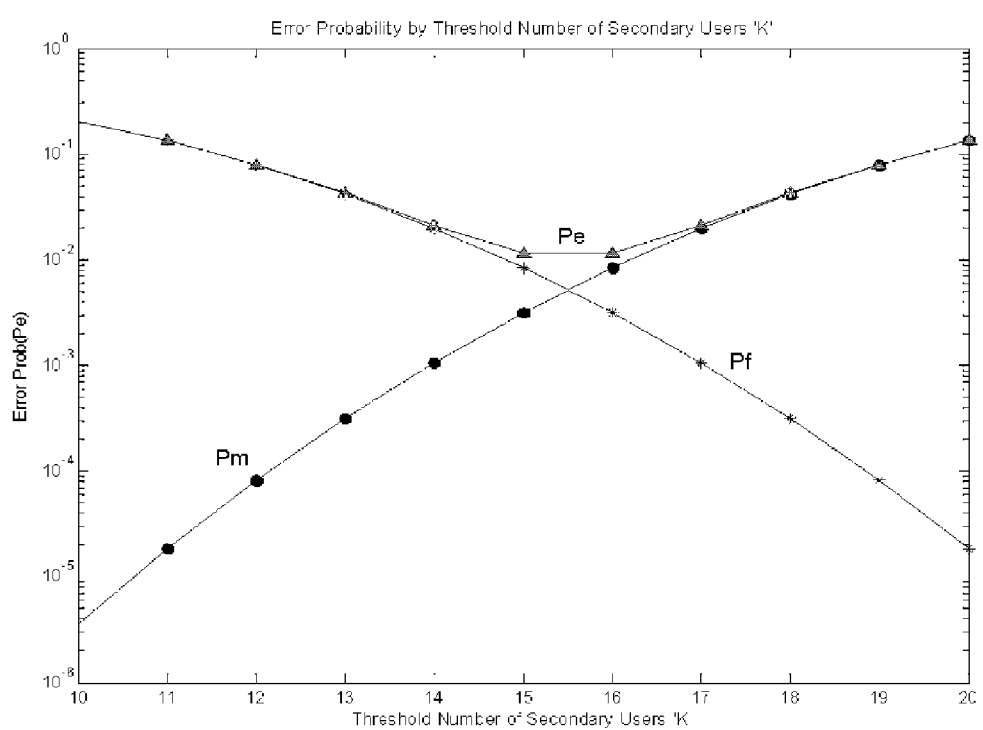
FIG. 4 is a graph of detection error probability, miss-detection probability, and false alarm probability versus SU threshold number.
Figure 5:
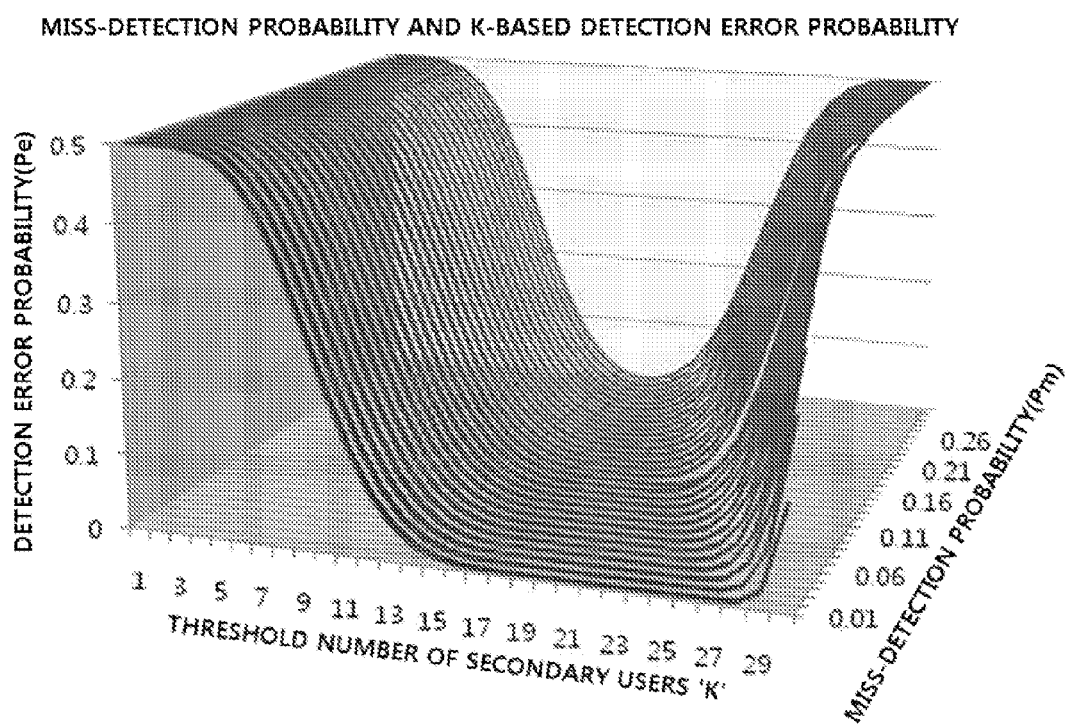
FIG. 5 is a graph of optimum SU threshold number versus miss-detection probability.

In cooperative spectrum sensing of several SUs according to the K-out-of-N rule, an overall miss-detection probability and false alarm probability may be expressed by Equation 1 below as a combination of miss-detection probabilities and false alarm probabilities respectively corresponding to the SUs. FIG. 4 is a graph of Equation 1.

$$K\text{-out-of-}N\text{-Rule}\begin{cases} P_{m,t} = 1 - \sum_{j=K}^{N} \binom{N}{j}(1-P_m)^j P_m^{N-j} \\ P_{f,t} = \sum_{j K}^{N} \binom{N}{j} P_f^j (1-P_f)^{N-j} \end{cases}$$ [Equation 1]

Here, $P_{m,t}$ is a probability that a final decision made by an FC will be a miss-detection error, and $P_{f,t}$ is a probability that a final decision of the FC will be a false alarm error.

Subsequently, the processor 24 calculates the optimum number of SUs on the basis of the miss-detection probabilities, the false alarm probabilities, and the predetermined frequency band use probabilities.

To calculate the optimum number of SUs, the processor 24 calculates a number $\tilde{K}$ minimizing an overall detection error probability using Equation 2 below.

$$\tilde{K} = \frac{\ln\left(\frac{P(H_1)P_m^N}{P(H_0)(1-P_f)^N}\right)}{\ln\left(\frac{P_f \cdot P_m}{(1-P_f)(1-P_m)}\right)}$$ [Equation 2]

Here, P(H1) is a probability that the PU will be using the predetermined frequency band, P(H0) is a probability that the PU will not be using the predetermined frequency band, Pm is a miss-detection probability of an SU (probability that the SU cannot detect a signal transmitted from the PU), Pf is a false alarm probability of the SU, N is the number of SUs in the predetermined zone. Then, the processor 24 determines a natural number closest to $\tilde{K}$ as the optimum number of SUs.

In cooperative spectrum sensing, detection errors need to be minimized, and the minimum of K capable of minimizing detection errors needs to be found. A final detection error probability Pe,t may be expressed by Equation 3 below.

$$P_{e,t} = P(H_1)P_{m,t} + P(H_0)P_{f,t}$$ [Equation 3]

Inserting Equation 1 into Equation 3 yields Equation 4 below.

$$P_{e,t} = P(H_1)\left\{1 - \sum_{j=K}^{N} \binom{N}{j}(1-P_m)^j P_m^{N-j}\right\} + P(H_0)\left\{\sum_{j=K}^{N} \binom{N}{j} P_f^j (1-P_f)^{N-j}\right\}$$ [Equation 4]

When the optimum value of K minimizing the final detection error probability Pe,t is $\tilde{K}$, the minimum is obtained from Equation 5 below.

$$P_{e,t}(\tilde{K}-1) - P_{e,t}(\tilde{K}) \approx 0$$ [Equation 5]

By inserting Equation 3 into Equation 4 and simplifying Equation 4, Equation 2 above is obtained.

Finally, the processor 24 performs cooperative spectrum sensing on the basis of local spectrum sensing information received from the optimum number of SUs in the Wi-Fi zone 13 (step 350).

Table 1 below shows the optimum number of SUs with respect to specific Pm and Pf and all SUs in a predetermined frequency band. Table 1 shows that a threshold of the optimum number of SUs is 8 when Pm is 0.2, Pf is 0.2, and N is 15.

TABLE 1

| N | $P_m = 0.2$<br>$P_f = 0.2$ | $P_m = 0.1$<br>$P_f = 0.3$ | $P_m = 0.05$<br>$P_f = 0.35$ |
| --- | --- | --- | --- |
| 15 | 8 | 10 | 11 |
| 19 | 10 | 13 | 14 |
| 23 | 12 | 15 | 17 |
| 25 | 13 | 16 | 18 |

Example embodiments of the present invention allow use of a vacant TV frequency for Wi-Fi data transmission according to IEEE 802.22, etc., thereby improving Wi-Fi capacity. However, in order to make a final decision and ensure reliability of a process of sensing a vacant frequency, it is necessary to know how many SUs need to detect that a PU is using a current frequency. Thus, example embodiments of the present invention find how many ($\tilde{K}$ □□) SUs are needed to determine that a frequency of a PU is being used in a corresponding-channel situation, thereby enabling efficient communication.

Example embodiments of the present invention can be used for cognitive radio (CR) technology enabling SUs in a predetermined zone to perform radio communication using a predetermined frequency band that is not being used by a PU. Example embodiments of the present invention can use a vacant frequency band of a television frequency spectrum for Wi-Fi data transmission according to IEEE 802.22.

While the example embodiments of the present invention and their advantages have been described in detail, it should be understood that various changes, substitutions and alterations may be made herein without departing from the scope of the invention.

What is claimed is:

1. A cognitive radio (CR) cooperative spectrum sensing method, comprising:
receiving, at a fusion center (FC), local spectrum sensing information about a predetermined frequency band from each of N secondary users (SUs) in a predetermined zone;
determining, at the FC, a value minimizing an overall detection error probability on the basis of the local spectrum sensing information and an optimum number of SUs for determining whether the predetermined frequency band is being used by a primary user (PU) on the basis of the value; and
performing cooperative spectrum sensing on the basis of local spectrum sensing information received from the optimum number of SUs in the predetermined zone.

2. The CR cooperative spectrum sensing method of claim 1, wherein the local spectrum sensing information is a determination signal indicating a determination of whether or not the predetermined frequency band is being used by the PU made by the SUs.

3. The CR cooperative spectrum sensing method of claim 2, wherein determining, at the FC, the optimum number of SUs includes:
providing a threshold of energy detection for generating the determination signal, a signal-to-noise ratio (SNR) of an additive white Gaussian noise (AWGN) channel, and a time-bandwidth product that is a product of a measurement time for generating the determination signal and a bandwidth of the predetermined frequency band;
calculating miss-detection probabilities, false alarm probabilities, and predetermined frequency band use probabilities of the SUs on the basis of the threshold, the SNR, the time-bandwidth product, and the local spectrum sensing information;
calculating the value on the basis of the miss-detection probabilities, the false alarm probabilities, and the predetermined frequency band use probabilities of the SUs; and
calculating the optimum number of SUs on the basis of the value.

4. The CR cooperative spectrum sensing method of claim 3, wherein calculating the optimum number of SUs includes:
calculating a number $\tilde{K}$ as the value minimizing an overall detection error probability using the equation, $$\tilde{K} = \frac{\ln\left(\frac{P(H_1)P_m^N}{P(H_0)(1-P_f)^N}\right)}{\ln\left(\frac{P_f \cdot P_m}{(1-P_f)(1-P_m)}\right)}$$

where $P(H_1)$ is a probability that the PU will be using the predetermined frequency band, $P(H_0)$ is a probability that the PU will not be using the predetermined frequency band, $P_m$ is a miss-detection probability of an SU (probability that the SU cannot detect a signal transmitted from the PU), $P_f$ is a false alarm probability of the SU, and N is the number of SUs in the predetermined zone; and
determining a natural number closest to $\tilde{K}$ as the optimum number of SUs.

5. The CR cooperative spectrum sensing method of claim 1, wherein the predetermined zone is a wireless fidelity (Wi-Fi) zone, and
the FC is an access point (AP) for Wi-Fi.

6. A fusion center (FC) performing cognitive radio (CR) cooperative spectrum sensing, comprising:
a receiver configured to receive local spectrum sensing information about a predetermined frequency band from each of N secondary users (SUs) in a predetermined zone;
an SU number determiner connected with the receiver and configured to determine a value minimizing an overall detection error probability on the basis of the local spectrum sensing information and an optimum number of SUs for determining whether the predetermined frequency band is being used by a primary user (PU) on the basis of the value; and
a cooperative spectrum sensor connected with the receiver and the SU number determiner, and configured to perform cooperative spectrum sensing on the basis of local spectrum sensing information received from the optimum number of SUs in the predetermined zone determined by the SU number determiner.

7. The FC of claim 6, wherein the local spectrum sensing information is a determination signal indicating a determination of whether or not the predetermined frequency band is being used by the PU made by the SUs.

8. The FC of claim 7, further comprising a storage configured to store a threshold of energy detection for generating the determination signal, a signal-to-noise ratio (SNR) of an additive white Gaussian noise (AWGN) channel, and a time-bandwidth product that is a product of a measurement time for generating the determination signal and a bandwidth of the predetermined frequency band,
wherein the SU number determiner calculates miss-detection probabilities, false alarm probabilities, and predetermined frequency band use probabilities of the SUs on the basis of the threshold, the SNR, the time-bandwidth product, and the local spectrum sensing information, and calculates the value on the basis of the miss-detection probabilities, the false alarm probabilities, and the predetermined frequency band use probabilities of the SUs; and calculates the optimum number of SUs on the basis of the value.

9. The FC of claim 8, wherein the SU number determiner calculates a number $\tilde{K}$ as the value minimizing an overall detection error probability using the equation, $$\tilde{K} = \frac{\ln\left(\frac{P(H_1)P_m^N}{P(H_0)(1-P_f)^N}\right)}{\ln\left(\frac{P_f \cdot P_m}{(1-P_f)(1-P_m)}\right)}$$

where $P(H_1)$ is a probability that the PU will be using the predetermined frequency band, $P(H_0)$ is a probability that the PU will not be using the predetermined frequency band, $P_m$ is a miss-detection probability of an SU (probability that the SU cannot detect a signal transmitted from the PU), $P_f$ is a false alarm probability of the SU, and N is the number of SUs in the predetermined zone, and
determines a natural number closest to $\tilde{K}$ as the optimum number of SUs.

10. The FC of claim 6, wherein the predetermined zone is a wireless fidelity (Wi-Fi) zone, and
the FC is an access point (AP) for Wi-Fi.

* * * * *